3,057,605
APPARATUS FOR WASHING SOLIDS FROM GAS STREAMS
Arthur F. Stone, Emerson, N.J., assignor to Chemical Construction Corporation, New York, N.Y., a corporation of Delaware
Filed Oct. 3, 1960, Ser. No. 59,982
1 Claim. (Cl. 261—22)

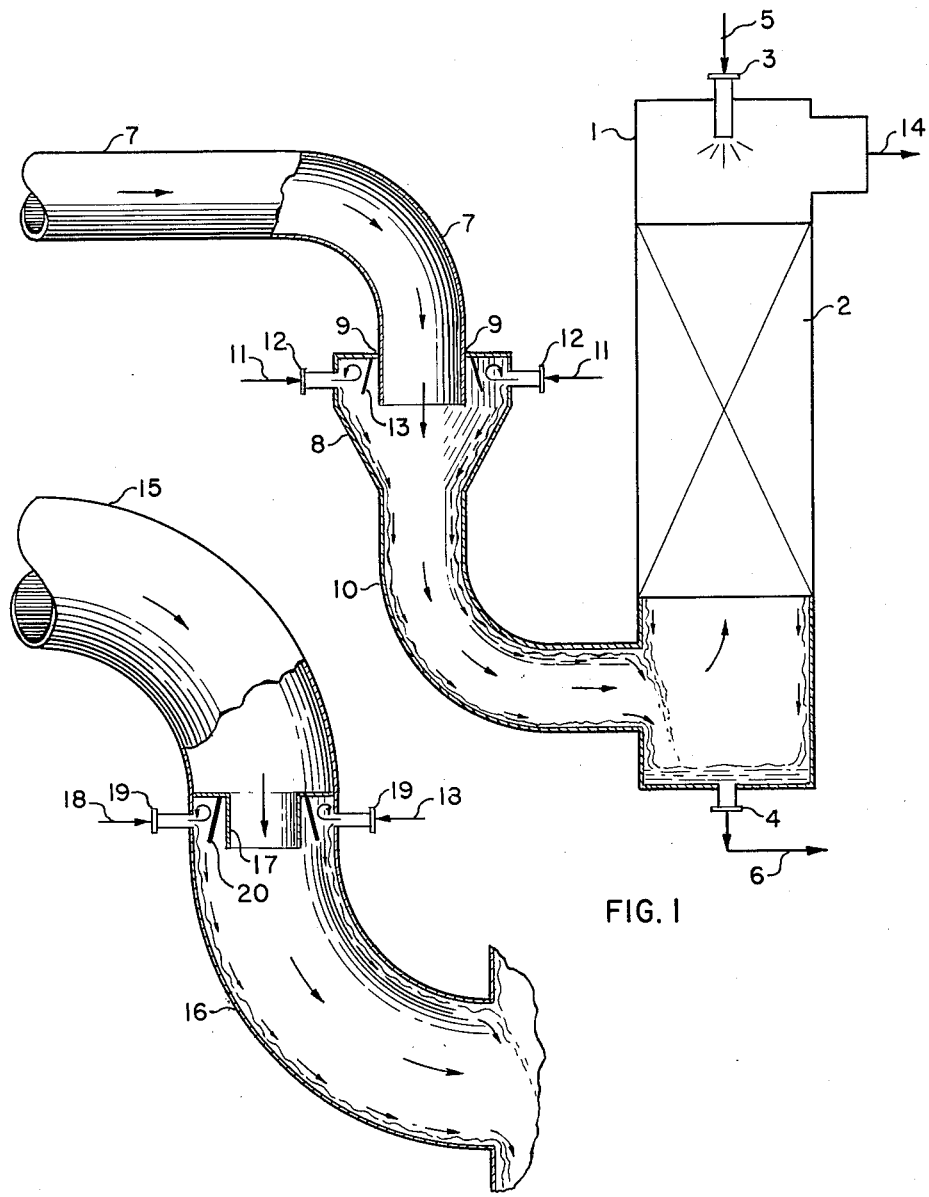

This invention relates to the removal of entrained solids from gas streams by the use of apparatus which provides a washing and scrubbing treatment of the gas stream using a liquid washing agent. An improved apparatus has been provided, which eliminates operating difficulties associated with the wet-dry line zone which forms when the gas stream is horizontally passed into such apparatus.

Numerous industrial installations exist in which a gas stream is scrubbed with a liquid agent in order to remove entrained solids. In most cases, a countercurrent scrubbing action is employed, which necessitates passing the solids-laden gas stream horizontally into the lower portion of the scrubbing apparatus. Typical of these is the packed tower unit, in which a cylindrical tower is filled with packing such as Raschig rings, and the input gas stream is passed into the base of the tower while the scrubbing liquid is dispersed into the top of the tower and flows downwards, countercurrent to the rising gas stream. Instead of packing, various types of trays may be employed, particularly when the entrained solid material has clogging tendencies. Other types of apparatus, such as shown in U.S. Patent No. 1,992,762, employ open towers in which a spray of scrubbing liquid is dispersed, and passed in contact with the rising gas stream.

In all such apparatus, the configuration of the flow patterns require that the input gas stream be admitted at the base of the apparatus, but above the bottom section where the downflowing scrubbing liquid collects. Thus, the input gas stream is passed substantially horizontally into the scrubbing unit, with the result that deposition of solid matter on the wall of the gas input duct may readily occur at the so-called "wet-dry line," where the gas stream contacts liquid inside the duct. The wet-dry line phenomenon is principally due to turbulence and back-cycling of liquid droplets, although in some cases capillary action may be an important factor in drawing liquid back into the gas stream inlet duct. The effects of wet-dry line formation are highly objectionable, and in some cases may radically interfere with normal operation of the facility. In all such situations, a buildup of partially wetted solid material occurs at the wet-dry line. This buildup may, in extreme cases, result in a complete blockage or clogging of the inlet duct. This is especially true in the case of hygroscopic materials such as lime or cement. Another serious effect is aggravated corrosion at the wet-dry line, due to concentration of partially dissolved solid material and consequent saturation of the liquid phase with dissolved ions having corrosive effects. This factor is particularly important when handling gas streams containing halides, such as exit gas from a calcium chloride dryer. Other processes such as ore roasting produce gas streams having pronounced acidic tendencies or strongly acidic components. Here the deposition effects at the wet-dry line readily produce rapid corrosion and equipment failure.

In the present invention, an apparatus is provided which completely eliminates any possibility of wet-dry line formation, when the solids-laden gas stream is passed into the bottom of a liquid scrubbing device. Broadly speaking, the apparatus of the present invention is applicable in any circumstance where such a gas stream is horizontally admitted into a liquid scrubbing facility. The apparatus is primarily characterized in that the incoming gas stream is preliminarily directed through a substantially vertical conduit section, before passing to the inlet of the liquid scrubbing facility. In the conduit section, means are provided to irrigate the walls of the conduit in such a manner as to provide an abrupt transition from complete dryness of the wall to complete wetness. The conduit is of a configuration which curves smoothly to the horizontal, whereby the walls are wetted throughout and thoroughly washed, thereby preventing dry spot formation and buildup of solid material. Details of preferred apparatus arrangements will be described infra, during the description of the figures.

The advantages of the apparatus of the present invention are comparatively obvious. A primary advantage is elimination of wet-dry line formation, which consequently prevents clogging of the apparatus and the extreme localized corrosion effects which may occur at the wet-dry line. Another advantage is the elimination of thermal shock effects in the inlet sections of the apparatus. These thermal effects have heretofore occurred when the solids-laden gas stream is hot. Thus under equilibrium conditions the inlet sections become heated upstream of the scrubbing apparatus. Liquid surges or other process upsets have thus resulted in sudden wetting and shock cooling of the highly heated surfaces, with consequent adverse effects. Likewise, process upsets resulting in sudden large rises in the inlet gas temperature have resulted in thermal shock within the scrubbing apparatus itself. These adverse effects due to the thermal shock are eliminated in the present invention, since the film of liquid flowing down the conduit wall acts as an insulator and also serves to cushion and moderate the temperature of a hot inlet gas stream by providing a cooling effect.

It is an object of the present invention to prevent wet-dry line formation and solids deposition in apparatus in which a liquid stream is employed to scrub entrained solids from a gas stream.

Another object is to prevent wet-dry line formation and solids deposition in apparatus in which a solids-laden gas stream is scrubbed counter-current to a liquid scrubbing agent.

A further object is to prevent wet-dry line formation and solids deposition in apparatus in which a solids-laden gas stream is passed into a liquid scrubbing apparatus in a substantially horizontal direction.

Still another object is to provide apparatus for horizontally admitting a solids-laden gas stream into a gas scrubbing apparatus which employs a liquid scrubbing agent.

An additional object is to prevent wet-dry line formation and thermal shock effects when a hot solids-laden gas stream is passed into a liquid scrubbing device which requires horizontal admittance of the gas stream into the device.

These and other objects and advantages of the present invention will become evident from the description which follows. FIGURE 1 provides an overall layout of one embodiment of the apparatus of the present invention, in conjunction with a gas-liquid contact unit. FIGURE 2 shows another configuration of the apparatus of the present invention, and is the preferred apparatus combination when the gas feed duct is of large diameter or when gas flow velocity is low. Referring to FIGURE 1, unit 1 is any gas scrubbing device or apparatus which requires horizontal admittance of the gas stream. Thus unit 1 is typically shown as a packed tower with packed section 2, upper liquid inlet 3 and lower liquid removal via 4. Washing liquid is admitted as stream 5, and removed together with solids scrubbed from the gas stream via 6.

The input solids-laden gas stream is received via duct 7, and is passed first into enclosure 8. It should be understood that, in this preferred embodiment, duct 7 is curved so as to enter enclosure 8 in a vertical direction, however, horizontal entry of duct 7 could be accomplished in practice, provided that suitable baffling of the liquid could be accomplished. As will appear infra, suitable baffling is a highly important aspect of the present invention. Enclosure 8 surrounds the lower end of duct 7, and is attached to duct 7 at point 9, above the lower end of duct 7. Thus the lower end of duct 7 extends freely into enclosure 8 in this preferred embodiment. Exclosure 8 extends downwards and joins vertical conduit 10. Conduit 10 in this preferred embodiment curves smoothly tangential to the horizontal, and ends at the horizontal gas inlet to unit 1. Liquid stream 11 is admitted into enclosure 8 by means of nozzles 12, and is diverted by baffle 13 so that wetting of the lower portion of duct 7 by liquid stream 11 is completely prevented. This is a highly important aspect of the present invention, since any wetting of duct 7 must of necessity result in the formation of a wet-dry line and defeat the purposes of the present invention. Baffle 13 thus is generally extended completely about the lower end of duct 7, and is preferably provided with an outwards incline in the downwards direction. In this manner, liquid stream 11 is prevented from contacting the outer surface of duct 7, and in addition stream 11 is projected back and upwards off baffle 13. The net result of this is that stream 11 is turbulently distributed by baffle 13, and completely wets the inner surface of container 8 in a uniform manner. Under the influence of gravity, the liquid stream next flows down across the inner surface of container 8 and thence through conduit 10. As will appear infra, nozzles 12 may be inclined so as to project stream 11 against baffle 13 at an angle relative to the perpendicular, or even tangentially. This modification serves to provide more uniform wetting of enclosure 8 by stream 11, since the liquid thus passes downwards in a swirling path.

Liquid stream 11 is thus directed smoothly downwards and completely wets the inside surfaces of enclosure 8 and conduit 10, as indicated in FIGURE 1. Thus the formation of a wet-dry line is completely prevented. The gas stream thus enters unit 1 where it is scrubbed, and leaves via 14. In practice, the formation of a wet-dry transition zone on baffles 13 may occur, however, the deposition of solids cannot take place due to inertia considerations. Thus in any particular installation, the lower portion of duct 7 within enclosure 8 may be suitably extended downwards relative to baffle 13 as far as required to achieve complete elimination of solids in the upper portion of enclosure 8. This and other suitable modifications will readily occur to those skilled in the art.

It is preferable to provide gas duct 7 and conduit 10 with circular cross-sections, however, square or rectangular units may be provided. Circular units are preferable in order to promote streamlined flow. Another advantage of circular units is that, when conduit 10 is a circular conduit, nozzles 11 may be inclined relative to the axis of the conduit. In this latter modification, a horizontal component of flow direction is imparted to the liquid stream 11, whereby a circular motion is imparted to the liquid stream flowing downwards inside enclosure 8 and conduit 10. This serves to promite a more uniform distribution of the liquid since the liquid spirals downward, and further insures elimination of dry spots. It is highly preferable that duct 7 and conduit 10 consist of coaxially aligned circular units of equal cross-sectional area, since it has been found that this modification serves to promote the maximum uniformity and smoothest streamline of the gas flow path.

Numerous equivalent apparatus elements to achieve the purposes of the present invention will occur to those skilled in the art. One such modification is shown in FIGURE 2. Here the input duct 15 for solids-laden gas and the conduit 16 are essentially combined, with diversion of gas flow being accomplished by barrier 17. The barrier 17 as shown in FIGURE 2 comprises a horizontal gas baffle terminating in a central opening and a co-axial inner duct extending vertically downward from the opening. The baffle 20 extends downward from the horizontal gas baffle. Streams 18, nozzles 19 and baffle 20 perform a function and have an effect similar to streams 11, nozzles 12, and baffle 13 described supra. The arrangement shown in FIGURE 2 is primarily suitable only in cases where the gas stream has a relatively low linear velocity, since otherwise pressure drop due to barrier 17 and consequent turbulence of the gas stream become adverse factors.

Other suitable modifications and apparatus configurations, similar to that shown in FIGURE 2, will occur to those skilled in the art and are within the scope of the present invention. Thus for example, additional liquid inlet means may be provided in conduit 10 to further promote the maintenance of a continuous film of downflowing liquid over the inner surface of conduit 10. It should be understood that the liquid entry to enclosure 8 as accomplished by apparatus elements 12 and 13 represents only a preferred embodiment of accomplishing the purposes of the present invention. Other apparatus means for providing liquid entry to the inner surface of enclosure 8 while preventing liquid contact with the lower portion of duct 7 within enclosure 8, will readily occur to those skilled in the art and are to be considered within the broadest scope of the present invention. Finally, it should be noted that the apparatus elements embodied within unit 1 of FIGURE 1 constitute merely one example of the many types of specific gas scrubbing apparatus with which the apparatus of the present invention may be advantageously and usefully combined. It will be found in practice that the performance of a diversity of gas scrubbing units which employ a liquid agent to remove entrained solids from the gas stream will be greatly improved through utilization of the concepts and apparatus of the present invention.

I claim:

Apparatus for washing entrained solids from a gas stream comprising a downwardly-extending vertical circular gas feed duct, said duct containing a stream of solids-laden gas, a horizontal gas baffle within said duct, said gas baffle extending inward and terminating at a circular central opening, a coaxial inner duct within said gas feed duct, said inner duct extending vertically downward from said opening and terminating within said gas feed duct, a liquid diverting baffle extending downward from said gas baffle and external to said inner duct, said baffle being outwardly inclined in a downward direction, a plurality of liquid feed nozzles tangentially disposed about the perimeter of said gas feed duct below said horizontal gas baffle, whereby liquid discharged from said nozzles flows onto the inner surface of said gas feed duct with a horizontal component of direction and assumes a spiral flow path within said duct, said gas feed duct smoothly curving to a lower horizontal terminus, a gas washing container, said container being provided with a lower horizontal gas inlet, an upper gas outlet means, and internal means for gas-liquid contact, the horizontal terminus of said gas feed duct being connected with said lower gas inlet to said gas washing container, with the entire inner surface of the portion of said gas feed duct which curves to a horizontal terminus being wetted by liquid discharged from said nozzles.

References Cited in the file of this patent

UNITED STATES PATENTS

| | | |
|---|---|---|
| 1,176,747 | Ferguson | Mar. 28, 1916 |
| 1,743,554 | Larkin | Jan. 14, 1930 |
| 2,684,836 | Arborgh et al. | July 27, 1954 |
| 3,009,687 | Hendriks | Nov. 21, 1961 |